March 4, 1958     E. H. CRAVER     2,825,249
DRILL JIG FOR WAVE GUIDE FLANGES
Filed Jan. 17, 1955
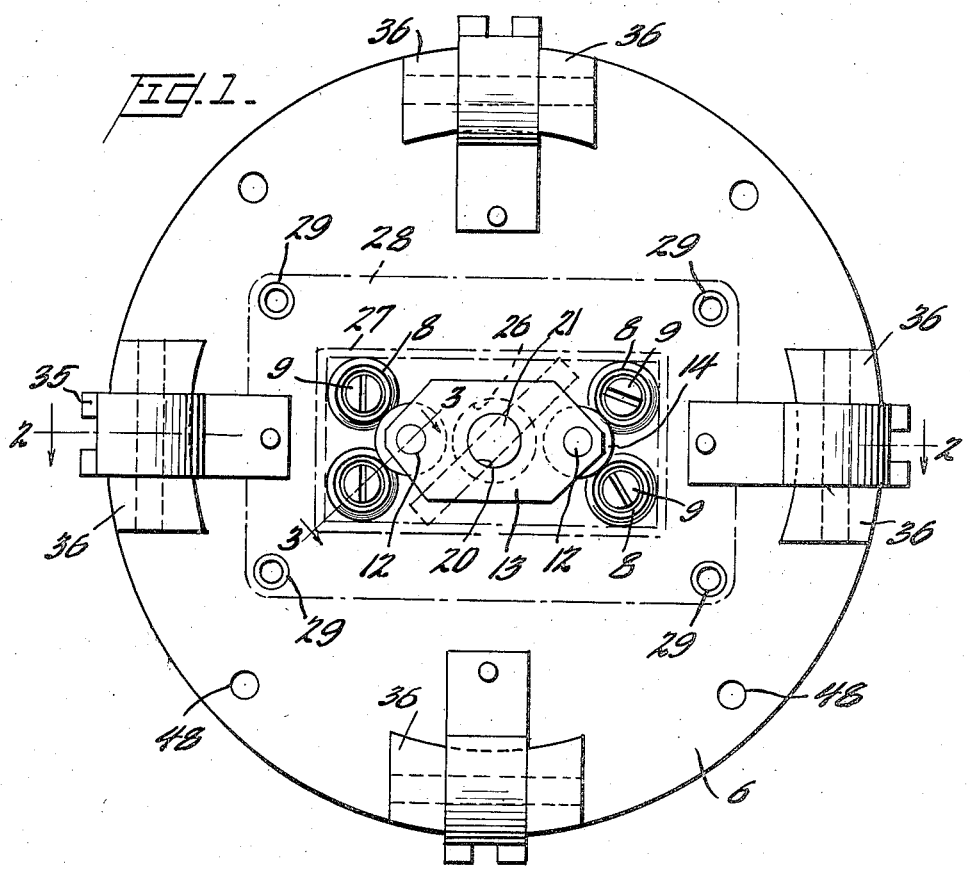
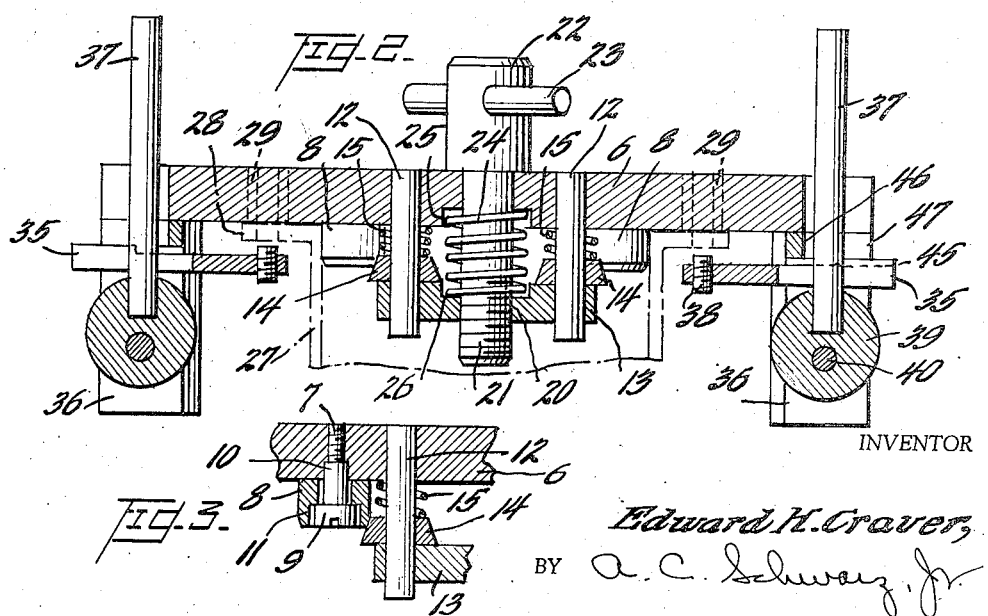
INVENTOR
Edward H. Craver,
BY A. C. Schwarz, Jr.
ATTORNEY though not specifically shown and described, it is believed clear that an operator skilled in the art will have no difficulty in constructing and operating a device in accordance with this disclosure.

United States Patent Office
2,825,249
Patented Mar. 4, 1958

2,825,249
DRILL JIG FOR WAVE GUIDE FLANGES

Edward H. Craver, Winston-Salem, N. C., assignor to Western Electric Company, Incorporated, New York, N. Y., a corporation of New York Application January 17, 1955, Serial No. 482,226

3 Claims. (Cl. 77—62)

This invention relates to devices for positioning objects and more particularly to a device for centering a drill jig with respect to the inner walls of an aperture in an article to be drilled.

In various manufacturing processes, such as the manufacture of tubular wave guides, it is essential to accurately locate various jigs and fixtures relative to the inner walls of passages in the wave guide or other article.

An object of the present invention is to provide a simple and efficient device for positioning an object to be worked upon with respect to a fixture.

In accordance with one embodiment of the invention as applied to a drill jig for use in drilling apertures in the flanges of rectangular wave guides, there is provided a base or template having drill guide bushings therein for guiding drills to the flanges of a wave guide and a plurality of movable cylinders are loosely attached to this base or template for movement parallel to the major surface of the template to a limited extent. These cylinders may be moved to engage the interior walls of the wave guide section by frusto-conical cams slidable in a direction perpendicular to the major surface of the template on pins mounted in the template by the action of a cam support slidable on said pins. The template also has fixed to it clamping means for clamping the wave guide in place against the template after the template has been centered with respect to the interior walls of the wave guide. A plate carrying the frusto-conical cams is normally urged away from the template but may be moved toward it by a manually operable threaded shaft to effect the movement of the wave guide relative to the template in effecting the positioning operation.

A better understanding of the invention may be had by reference to the following detailed description when considered in conjunction with the accompanying drawings, wherein:

Fig. 1 is a view looking up at the bottom of a template and showing the wave guide positioned thereon in dot and dash lines;

Fig. 2 is a transverse inverted vertical sectional view taken along the line 2—2 of Fig. 1 in the direction of the arrows, and Fig. 3 is a transverse inverted vertical sectional view taken along the line 3—3 of Fig. 1 in the direction of the arrows showing the relation between the frusto-conical cams and the movable cylinder members.

Referring now to the drawings wherein like reference numerals designate the same parts throughout the several views, 6 designates a base or template into which shouldered and headed screws 7 are threaded to mount floating cylinders 8 against the bottom surface of the template 6. It will be noted that the head 9 of the screw 7 and the shouldered portion 10 of the screw 7 are smaller than the adjacent portions of the aperture 11 in the cylinders 8 whereby a limited amount of movement of the cylinders 8 parallel to the major surface of the template 6 is possible.

The template 6 has a pair of pins 12 fixed to it for guiding a movable plate 13 for movement toward and away from the major surface of the template 6. The movable plate 13 is slidable along the pins 12 each of which has mounted on it a frusto-conical camming member 14, coiled springs 15 being interposed between the upper surface of the cams 14 and the lower surface (Figs. 2 and 3) of the template 6 normally to urge the cams downwardly away from the template 6. The movable plate 13 is provided with a central threaded aperture 20 for receiving the threaded shank of an actuating screw 21. The screw 21 has an enlarged head 22 which bears against the upper surface of the template 6 and is also provided with a handle 23 to facilitate its manipulation. The head 22 of the screw 21 bears against the upper surface of the template 6 being urged against that surface by a coiled spring 24 which encloses the shank of the screw 21 and is nested in depressions 25 and 26 in the template 6 and movable plate 13 respectively. There are four of the cylinders 8 mounted on the template 6 two of which cooperate with one of the frusto-conical cams 14 and the other two of which cooperate with the other frusto-conical cam 14 whereby when a section of wave guide 27 is placed with its flanges 28 against the surface of the template 6 and the movable plate 13 is drawn toward the template 6, the cylinders 8 will be urged outwardly by the frusto-conical cams 14 to engage the inner surfaces of side and end walls of the setion of the wave guide. In this manner the flanges 28 will be located with a high degree of accuracy with respect to drill guide bushings 29, set into the template 6. Thus, apertures may be drilled in the flanges 28 of sections of wave guide which are to abutted one against the other with a high degree of accuracy with respect to the center of the aperture in the wave guide whereby when the wave guide sections are assembled the interior walls thereof will be aligned with a high degree of accuracy.

After the template 6 and the wave guide section 27 have been aligned relative one to the other, the wave guide section may be clamped to the under side of the template 6 by means of clamping levers 35 which are slidably and oscillatably mounted between bifurcated bearing posts 36. The clamping levers 35 are bifurcated to receive cam actuating levers 37 between the furcations thereof and the inner ends of the levers 35 carry adjustable clamping elements 38 threaded into the levers 35 adjacent the inner ends of the levers whereby the elements 38 may be adjusted with respect to the lever and may be moved into clamping engagement with the flange 28 of the wave guide when the cam actuating levers 37 are moved to the positions shown in Fig. 2. Each of the actuating levers 37 are fixed to cams 39 which are positioned between the bearing posts 36 and are mounted on shafts 40. The levers 35 each have a shoulder 45 formed on it to serve as a pivot edge about which the clamping levers 35 will pivot when the cam 39 is rocked to the position shown to effect the clamping of a wave guide flange against the under side of the base 6. A base 46 is integral with each pair of bearing posts 36 and is slotted as shown at 47 to receive the cam actuating levers 37, but is sufficiently wide to provide surfaces against which the shoulder 45 will bear when the clamping levers are rocked to clamping position by the cams 39. The base 6 is provided with pilot holes 48 whereby the platen may be accurately positioned with respect to a drill press, not shown.

In the use of the fixture the base or template 6 may be inverted as shown in Fig. 1, and a section of wave guide may be placed thereon with the cylinders 8 extending upwardly into the interior of the wave guide section, the actuating screw 21 having been rotated by means of the handle 23 to a position where the spring 24 in cooperation with the springs 15 will have moved the frusto-conical cams 14 away from the base or template 6. Thus the cylinders 8 will be free to move to a position where they will freely enter the interior of the wave guide section it being noted that as viewed in Fig. 2 the lower ends of the cylinders 8 have a slight taper formed on them which will facilitate their entrance into the interior of the wave guide section. After the wave guide section has been placed on the base or template 6, the actuating screw 21 may be manipulated to draw the movable plate 13 toward the base or template 6 thereby to force each of the two frusto-conical cams 14 into engagement with two of the cylinders 8 thereby to force the cylinders 8 outwardly away from the actuating screw 21 and to thereby engage the straight side of each of the cylinders 8 with two walls of the wave guide section 27 to float the wave guide section into a position where the side walls of the wave guide section are equally spaced from the axis of the screw 21 and the end walls are also spaced equal distances from the axis of the screw 21 thereby to accurately locate the wave guide section with respect to the drill guide bushings 29. After the wave guide section has thus been located, the clamping levers 35 may be moved inwardly to the position shown in Figs. 1 and 2 where the clamping elements 38 may be engaged with the flange 28 of the wave guide section 27 to clamp the wave guide section to the base or template 6. After the template or base 6 and wave guide section 27 have thus been accurately aligned with respect one to the other the entire assemblage may be mounted upon a fixture on the bed of a drill press by entering pilot pins, not shown, in the pilot holes 48.

Although a specific embodiment of the invention has been described hereinbefore it will be understood that modifications thereof may be made without departing from the scope and spirit of the invention.

What is claimed is:

1. A drill jig having means thereon for locating it relative to an aperture in an article to be drilled, said means comprising a threaded member freely rotatable with respect to the jig, a plate threaded on said threaded member, means for holding said plate against rotation, a plurality of frusto-conical cams mounted on said plate for movement therewith, and floating article engaging cylinders mounted on said jig for movement by said cams to engage the walls of the aperture in the article.

2. A device for aligning an article having an aperture therein with a fixture which includes a template comprising a plate movable toward and away from said template, a plurality of pins for guiding said plate in its movement, a plurality of frusto-conical cams slidable on said pins, means for urging said plate away from said template, means for urging said cams into engagement with said plate, a plurality of cylinders adapted to engage each of said cams, and means for mounting said cylinders on said template for universal movement in a plane parallel to said template.

3. A drill jig having means thereon for locating it relative to an aperture in an article to be drilled, said means comprising a threaded member freely rotatable with respect to the jig, a plate threaded on said threaded means, a plurality of guide pins for holding said plate against rotation with respect to the jig, a plurality of cams slidably and rotatably mounted on said guide pins, and laterally floating article engaging cylinders movable by said cams to engage the walls of the aperture in the article.

References Cited in the file of this patent
UNITED STATES PATENTS

| | | |
|---|---|---|
| 1,547,595 | Lofland | July 28, 1925 |
| 1,916,414 | Chapman | July 4, 1933 |
| 1,980,288 | Olson | Nov. 13, 1934 |
| 2,412,458 | Kivley | Dec. 10, 1946 |
| 2,412,459 | Stull | Dec. 10, 1946 |